US011240333B2

(12) United States Patent
Umakoshi et al.

(10) Patent No.: US 11,240,333 B2
(45) Date of Patent: Feb. 1, 2022

(54) ID SPACE CONVERSION SYSTEM AND METHOD FOR THE SAME

(71) Applicant: NIPPON TELEGRAPH AND TELEPHONE CORPORATION, Tokyo (JP)

(72) Inventors: Kenji Umakoshi, Musashino (JP); Ryohei Banno, Musashino (JP)

(73) Assignee: NIPPON TELEGRAPH AND TELEPHONE CORPORATION, Tokyo (JP)

(*) Notice: Subject to any disclaimer, the term of this patent is extended or adjusted under 35 U.S.C. 154(b) by 165 days.

(21) Appl. No.: 16/608,143

(22) PCT Filed: Jan. 30, 2018

(86) PCT No.: PCT/JP2018/002916
§ 371 (c)(1),
(2) Date: Oct. 24, 2019

(87) PCT Pub. No.: WO2018/198460
PCT Pub. Date: Nov. 1, 2018

(65) Prior Publication Data
US 2020/0177693 A1 Jun. 4, 2020

(30) Foreign Application Priority Data
Apr. 28, 2017 (JP) .............................. JP2017-090147

(51) Int. Cl.
*H04L 29/08* (2006.01)
*H04L 12/24* (2006.01)
*H04L 29/12* (2006.01)

(52) U.S. Cl.
CPC ...... *H04L 67/2809* (2013.01); *H04L 41/0866* (2013.01); *H04L 61/301* (2013.01); *H04L 67/12* (2013.01); *H04L 67/2804* (2013.01)

(58) Field of Classification Search
CPC .......................... H04L 41/0866; H04L 61/301
(Continued)

(56) References Cited

U.S. PATENT DOCUMENTS

2007/0282944 A1 12/2007 Odaka et al.
2007/0299956 A1 12/2007 Odaka et al.
(Continued)

FOREIGN PATENT DOCUMENTS

JP   2007-156779 A   6/2007
JP   2010-205098 A   9/2010
JP   2010-206350 A   9/2010

OTHER PUBLICATIONS

Shogo Nakahara, Kinko Sueda and Yoshikatsu Tada, "Proposal and Evaluation of Integration Accessing Technique to devices in M2M", Information Processing Society of Japan Journal, vol. 56 No. 1, pp. 273-283 (Jan. 2015).
Kenta Ueda, Takahiro Kosaka and Kenya Sato, "Proposal of Integrated Device linkage Method using REST Architecture", Information Processing Society of Japan, Research Report, pp. 51-57, Nov. 28, 2008.
(Continued)

*Primary Examiner* — Wing F Chan
*Assistant Examiner* — Leon Y Tseng
(74) *Attorney, Agent, or Firm* — Harness, Dickey & Pierce, P.L.C.

(57) ABSTRACT

Provided is an ID space conversion system enabling an application to access a correct data resource by using a system ID.
An ID space conversion function unit generates a non-overlapping unique system ID for each type of components based on a physical ID of a component included in a device D which is determined to be a correct device by a device configuration verification function unit. A sharing function unit shares, with a gateway, a gateway file including a correspondence relationship between the physical ID and the system ID included in the device D. Accordingly, the gateway adds, to data, the system ID, on the basis of the
(Continued)

gateway-setting file, and outputs system ID-added data to a network. A data processing unit determines whether component data of the device D includes the generated system ID. Accordingly, it is determined whether the data is output from the correct device.

20 Claims, 10 Drawing Sheets

(58) Field of Classification Search
USPC .......................................................... 709/217
See application file for complete search history.

(56) References Cited

U.S. PATENT DOCUMENTS

| | | | | |
|---|---|---|---|---|
| 2012/0167085 | A1* | 6/2012 | Subramaniyan | G06F 13/105 718/1 |
| 2018/0152313 | A1* | 5/2018 | Jennequin | H04L 12/6418 |
| 2018/0191698 | A1* | 7/2018 | Kundu | H04L 67/306 |

OTHER PUBLICATIONS

International Search Report (in English and Japanese) issued in International Application No. PCT/JP2018/002916, dated Apr. 10, 2018; ISA/JP.
Japanese Office Action from counterpart JP2019515098, dated Jan. 7, 2020.
Umagoe, Kenji et al., "Ubiquitous Service Platform With Service Level Adjustment Considering Of Location Change Of User And Devices", Technical report of the Institute of Electronics, Information and Communication Engineers, Japan, Society of Electronic Information Communication, Aug. 16, 2010, vol. 110, No. 172, pp. 43-48 (AI2010-17), ISSN 0913-5685.
Umagoe, Kenji et al. "Smart Shadow: Real World Service Platform", Proceedings of the 2012 General Conference of the Institute of Electronics, Information and Communication Engineers, Japan, Society of Electronic Information Communication, Mar. 6, 2012, Communication 2, pp. S-132 to S-133 (BDS-1-4), ISSN 1349-1369.
International Preliminary Report on Patentability regarding PCT/JP2018/002916, including the English translation of the Written Opinion, dated Nov. 7, 2019.

* cited by examiner

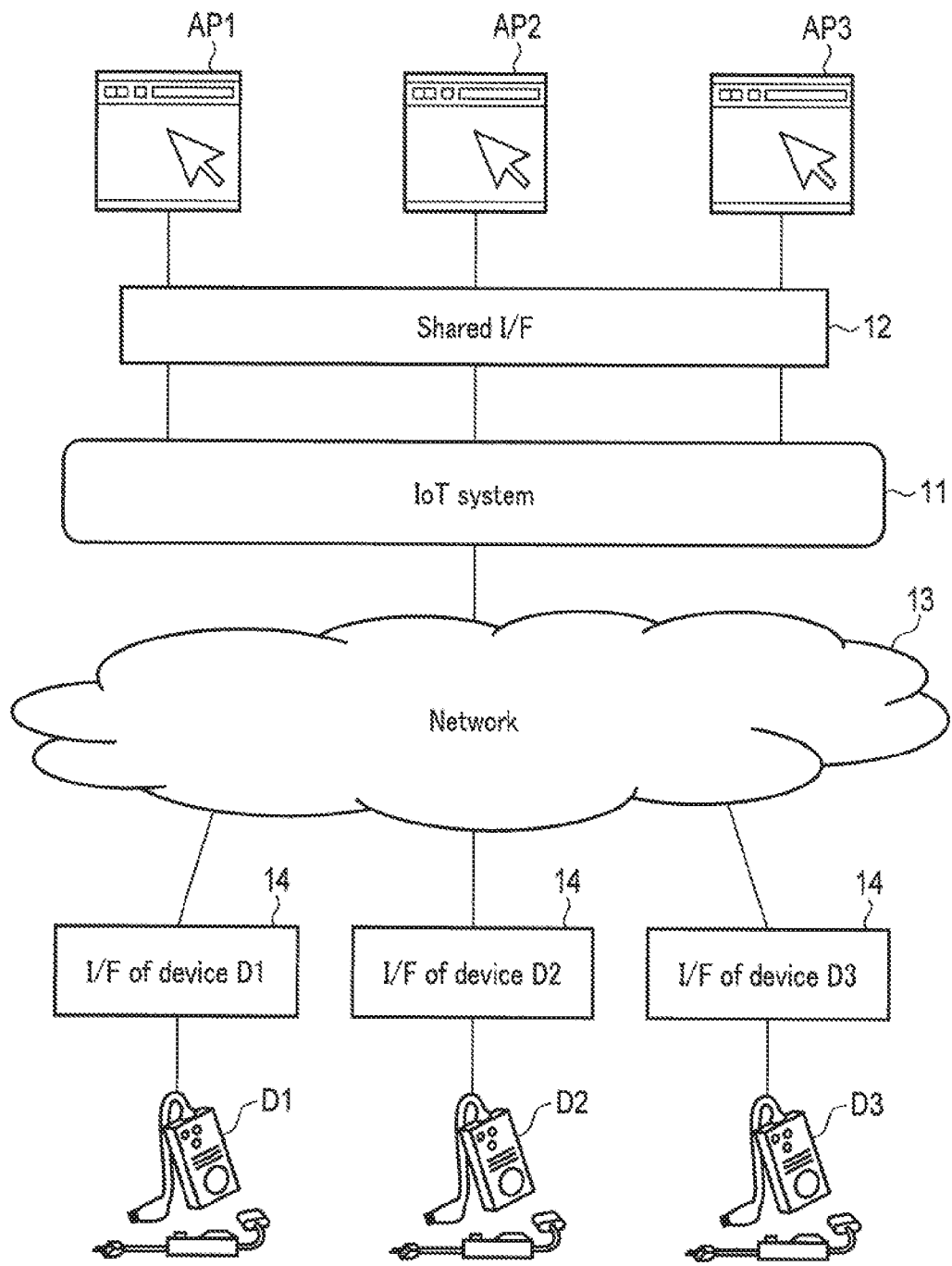
F I G. 1

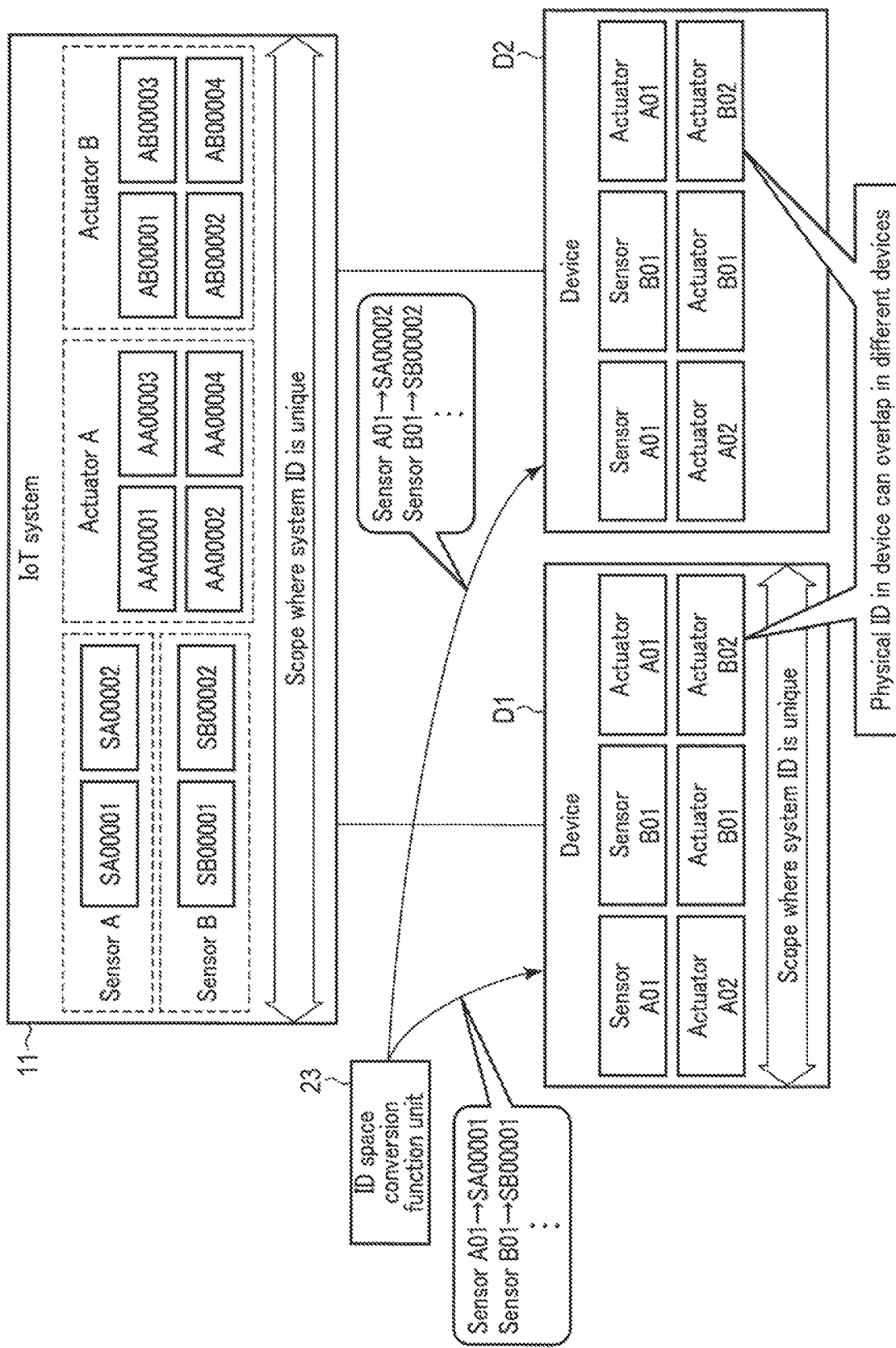
F I G. 4

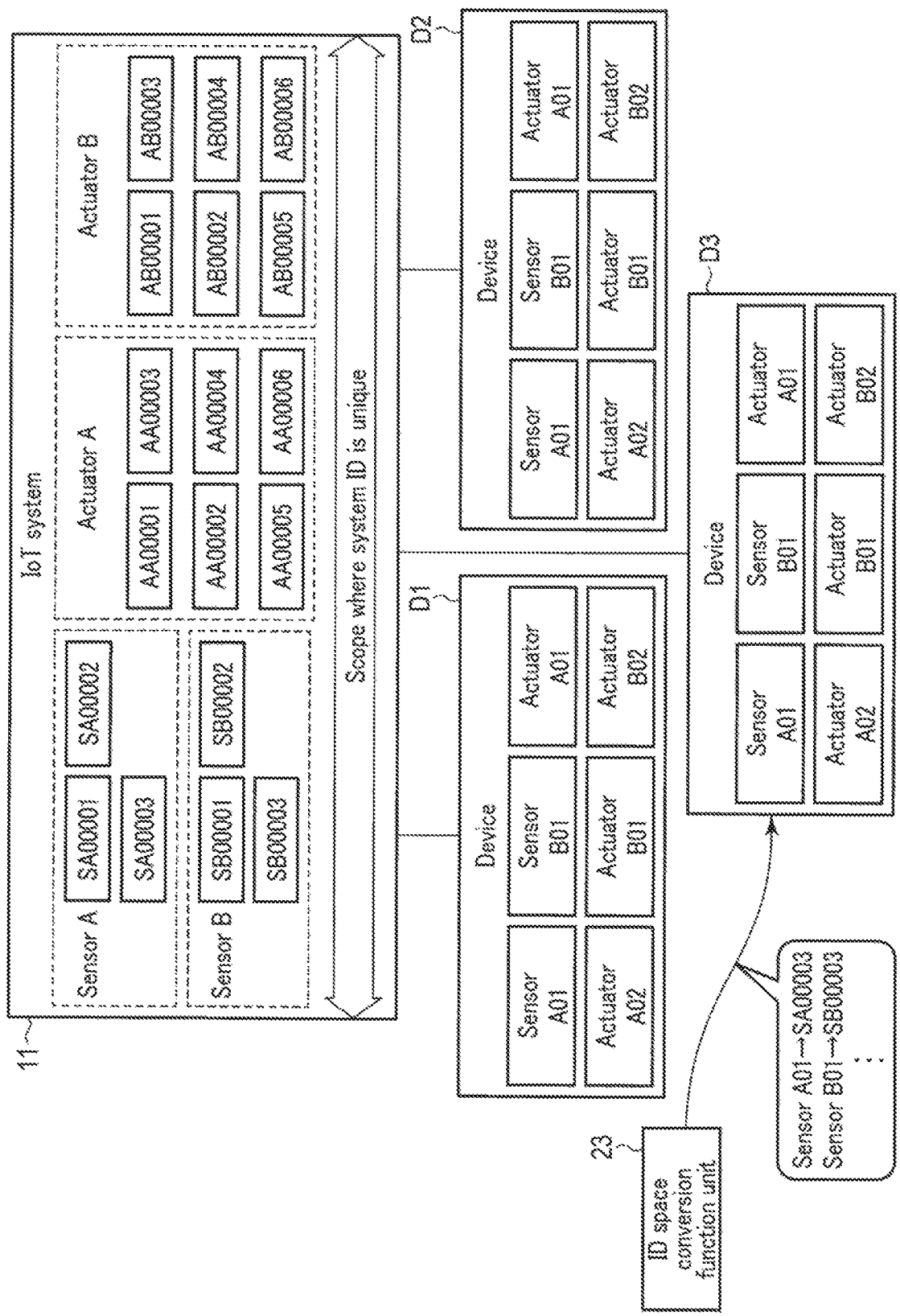
F I G. 5

ID SPACE CONVERSION SYSTEM AND METHOD FOR THE SAME

CROSS-REFERENCE TO RELATED APPLICATIONS

This is a U.S. National Phase Application under 35 USC 371 of International Application PCT/JP2018/002916 (not published in English), filed Jan. 30, 2018, which claims priority to Japanese Patent Application No. 2017-090147, filed on Apr. 28, 2017. The entire disclosures of the above applications are incorporated herein by reference.

FIELD

The present invention relates to an ID space conversion system and a method for the ID space conversion system.

BACKGROUND

Recently, the IoT (Internet of Things) in which various devices are connected to a network to utilize data, has been garnering attention. In a system intended for IoT, a variety of different devices which have been utilized as conventional OT (Operational Technology) are connected or disconnected as necessary. The system thus requires a function for time-serially controlling IDs, so that various devices and components for the devices can be uniquely identified, without overlaps.

In the OT, sensors and actuators that output data can be uniquely identified in devices in which they are installed through use of some type of ID. Hereinafter, this ID is designated as a physical ID.

On the other hand, when an application uses data accumulated in a database in an IoT system, outliers can be detected and future predictions performed from statistical information by time-serially acquiring and analyzing values of sensors of the same type crossing different devices. If, in the case when an application accesses data in the sensors/actuators crossing devices, a unique ID exists for each such sensors/actuators of the same type, this allows for effective data acquisition and effective data analyses. Hereinafter, the ID unique to sensors/actuators of the same type is designated as a system ID.

The physical ID and the system ID are defined in independent ID spaces in which the scope of uniqueness, ID-setting person, and setting rules respectively differ; however, data that can be acquired by an application through the use of a system ID needs to be consistently associated with sensors/actuators having a physical ID corresponding to the system ID. That is, the physical ID and the system ID need to maintain a one-to-one relationship. Otherwise, data acquired by using a certain system ID will mean, in some cases, data acquired from a different sensor/actuator, thus rendering it impossible to use for an analysis through the application. A correspondence relationship between a physical ID and a system ID is shown in FIG. 10.

As shown in the same figure, for example, in a physical ID space 1, devices D1 to D3 exist. The device D1 has a physical ID for a sensor A001, a sensor B001, an actuator A001, an actuator A002, an actuator B001, and an actuator B002. It is assumed that the device D2 has a physical ID for a sensor A01 and the sensor B001, and the device D3 has a physical ID for an actuator a002, an actuator b001, and a sensor a001.

The physical ID of the device D1 in the physical ID space 1 is unique in the device D1. The physical IDs of the devices D2 and D3 in the other devices D2 and D3 are also uniquely defined in the devices D2 and D3 respectively.

In a system ID space 2, the sensor A001 in the device D1 has a system ID of "SA002" in a sensor A class in the system ID space 2, and the sensor B001 in the device D1 has a system ID of "SB001" in a sensor B class in the system ID space 2. The uniqueness of the system ID in the system ID space 2 is component classes of the devices D1 to D3 (e.g., sensor A class, sensor B class, etc.).

Also, it is considered that when an application uses data in sensors/actuators, the application performs an advanced analysis by using the association between sensors, between actuators, or between a sensor and an actuator without using respective independent data. To this end, the system needs to manage the associations of these components as a configuration of the device and make them available from the application. However, the configuration is not uniform even among the same types of devices. Several variations can be present for each individual device in response to the environment in which a device is installed or a customization request from a user, and the device configuration thus needs to be managed for each device to be connected to a system.

CITATION LIST

Non Patent Literature

Non Patent Literature 1: Information Processing Society of Japan Journal Vol. 56 No. 1, pp. 273-283 (January 2015), Shogo Nakahara, Kinko Sueda, Yoshikatsu Tada, "Proposal and Evaluation of Integration Accessing Technique to devices in M2M"

Non Patent Literature 2: Information Processing Society of Japan, Research Report, Kenta Ueda, Takahiro Kosaka, and Kenya Sato, "Proposal of Integrated Device linkage Method using REST Architecture", Nov. 28, 2008, pp. 51-57

SUMMARY

More data can be utilized by connecting to an IoT system not only exclusive devices each having a function for connection to the IoT system, but also existing devices having no such connection function, via a gateway, etc. For the latter, there may be a case where it is more rational to set the device configuration manually rather than add a function for automatically acquiring a device configuration from the device. The device configuration that has been manually set is registered in a system and subsequently acquired from an application. In this case, however, there is a risk that a configuration which does not conform to the design of the device would be registered due to a recognition error or a lack of knowledge on the part of the operator who set the configuration, and an application might not acquire a correct device configuration.

The present invention has been made in view of the above-mentioned actual situation, and an object of the present invention is to provide an ID space conversion system in which an application can use a system ID to access a correct data resource.

According to a first invention of the present invention, an ID space conversion system is provided which consistently provides setting information to both a gateway and a data processing unit, to which a plurality of devices, each including components, are connected via the gateway and a network; to which a plurality of applications are also connected; and which mediates data between the plurality of devices and the plurality of applications, the system including: an ID space conversion function unit that generates a non-overlapping unique system ID for each component type on the basis of a physical ID of the component included in the device; and a sharing function unit that creates gateway-setting information, including a correspondence relationship between the physical ID of the component included in the device and the system ID generated by the ID space conversion function unit, and shares the gateway-setting information with the gateway. The data processing unit then determines whether data of the device component sent from the device via the gateway includes the generated system ID, and the gateway adds, based on the created gateway-setting information, to the data of the component obtained from the device, the generated system ID corresponding to the physical ID of the component included in the device and outputs system ID-added data to the network.

According to the first invention of the present invention, a non-overlapping unique system ID is generated for each type of component via the ID space conversion function unit. Then, the data processing unit determines whether data of a component of the device sent via a gateway includes a generated system ID, and it is thus possible to recognize that data not including the system ID is incorrect data.

According to a second invention of the present invention, the first invention is an ID space conversion unit which further includes a device configuration verification function unit that determines whether specific device configuration information, including component information on the device given to the ID space conversion system and relation information for tracing the component information is information corresponding to a correct device which conforms to device design definition information defined for each of the plurality of devices, and consisting of component definition information indicating each component and relation information for tracing the component definition information, wherein the ID space conversion function unit is configured to generate the system ID for the device determined as the correct device by the device configuration verification function unit.

According to the second invention, it is possible to generate a system ID for a device determined to be a correct device by the device configuration verification function unit, and for a correct device in which specific device configuration information conforms to device design definition information.

According to a third invention of the present invention, in the second invention, the sharing function unit shares, between the sharing function unit and the gateway, specific device configuration information for the device determined to be the correct device.

According to the third invention of the present application, the sharing unit shares specific device configuration information for a device determined to be a correct device with the sharing function unit and the gateway, and thus the gateway and the application can refer to the specific device configuration information.

According to a fourth invention of the present invention, in the first invention, the ID space conversion function unit generates a new system ID that does not overlap existing system IDs when a new device is connected to the ID space conversion system, and when a combination of an ID of the new device and a physical ID of the new device has not been registered.

According to the fourth invention of the present invention, the ID space conversion function unit generates a new system ID that does not overlap existing system IDs when a new device is connected to the ID space conversion system, and when a combination between an ID for the new device and a physical ID has not been registered, meaning that a system ID does not overlap with devices of the same type.

According to a fifth invention of the present application, in the first invention, the ID space conversion function unit further uses the generated system ID when a new device is connected to the ID space conversion system, and when a combination between an ID for the new device and a physical ID is already registered.

According to the fifth invention of the present invention, the ID space conversion function unit further uses the generated system ID when a new device is connected to the ID space conversion system, and when a combination between an ID for the new device and a physical ID has been registered, thus rendering it possible to effectively use the system ID. Also, when a device which is once connected and then disconnected is connected once more, the same system ID is assigned to the device, rendering it possible to use data accumulated when connected the first time by using the same system ID.

According to a sixth invention of the present invention, in the first invention, the data processing unit discards the data of the component of the device sent from the device via the gateway when the data of the component of the device does not include the generated system ID.

According to the sixth invention of the present application, data obtained from an incorrect device is discarded, thus rendering it possible to prevent incorrect data from being mediated to an application.

According to a seventh invention of the present invention, in the second invention, the device configuration verification function unit reports that the device connected to the ID space conversion system, or setting thereof, is not correct when the component information or relation information of the specific device configuration information on the device is determined to be incorrect by the device configuration verification function unit.

According to the seventh invention of the present invention, when the component information or relation information of the specific device configuration information is not correct, it is possible to report that the device or setting thereof is not correct.

According to the present invention, it is possible to provide an ID space conversion system in which an application can use a system ID to access a correct data resource.

BRIEF DESCRIPTION OF THE DRAWINGS

FIG. 1 is a diagram for explaining an environment in which an IoT system 11 according to an embodiment is used.

FIG. 4 is a diagram for explaining ID space conversion processing in an ID space conversion function unit 23.

FIG. 5 is a diagram illustrating a case where a device D3 is connected to the IoT system 11 from the state shown in FIG. 4.

DETAILED DESCRIPTION

Figure 2:
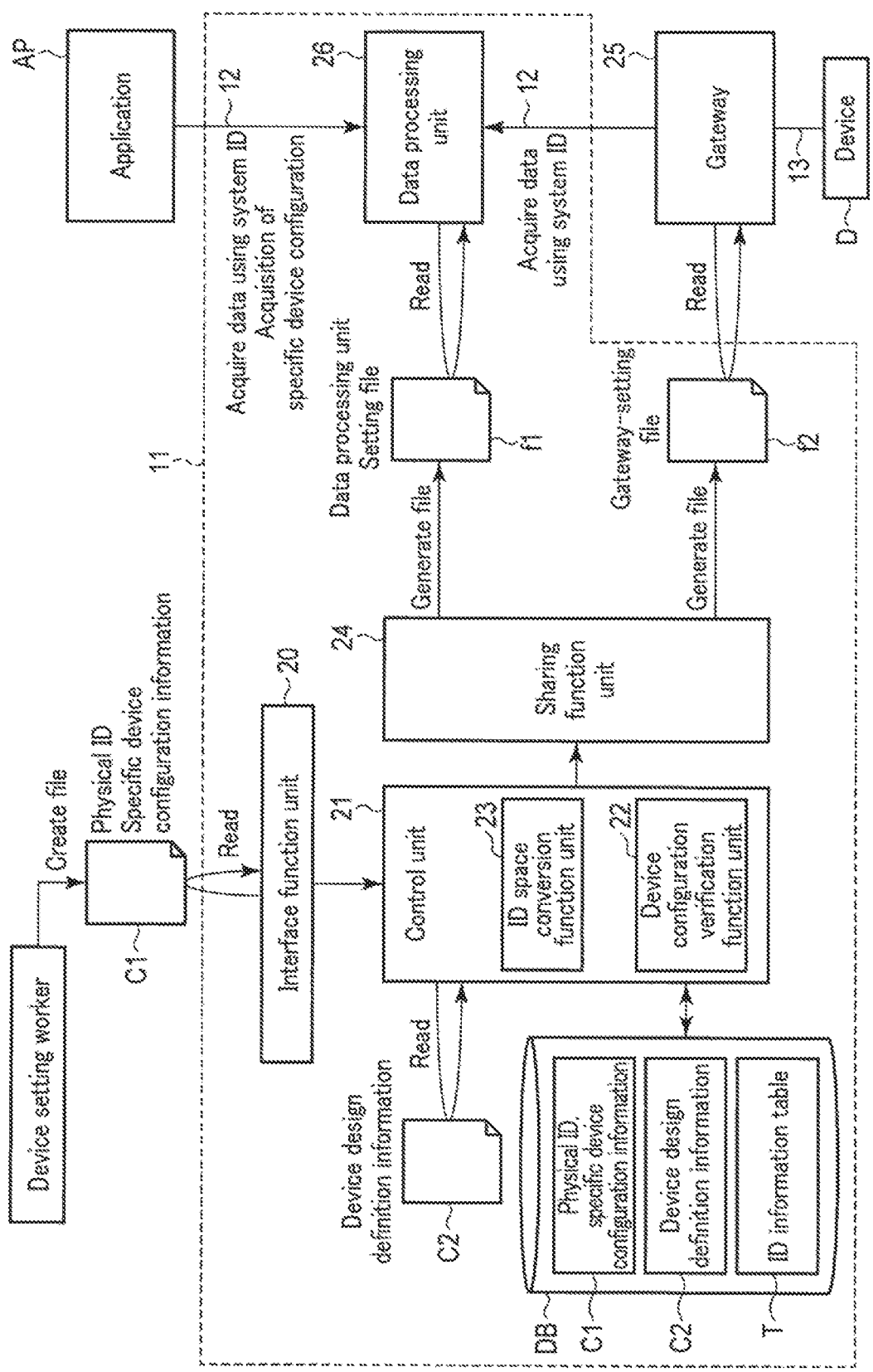
FIG. 2 is a diagram illustrating a functional block of the IoT system 11 according to the embodiment.

Hereinafter, an IoT system according to an embodiment of the present invention will be described with reference to drawings.

1. Summary of Embodiments

With respect to a method for maintaining a correspondence relationship between a physical ID and a system ID, in IoT, connecting existing devices to a system can also be considered, and therefore a scheme of converting an existing physical ID to a system ID on the basis of the existing physical ID will be considered. A special consideration is then required for a system ID generation method in the following cases. Furthermore, when a plurality of devices are simultaneously connected in parallel to a system, there is a need to generate a non-overlapping system ID among the plurality of devices.

A. If connection or disconnection to a device or re-connection arises, a system ID used by a device that has been eliminated must not be assigned to the other devices. Also, when the device is re-connected, the same system ID used when the device was previously connected must be assigned to the device.

B. If a specific configuration of a device which has been manually set and registered in a system does not conform to the design, an application can acquire only an erroneous device configuration, and it becomes impossible to perform an assumed data analysis.

In the embodiments, a mechanism is contrived which helps avoid the generation of overlapping system IDs and generating consistent system IDs even under an environment where disconnection and re-connection arise, by focusing attention on many cases where components can be grouped even in an IoT system to which many different devices are connected using some sort of basis, such as regional locality, owner's attribute, or the like, by performing ID conversion for each group independently and in block within a group. In the embodiments, as specific examples of groups, classes representing the types of components (Sensor A class, Sensor B class, Actuator A class, etc.) are used.

Also, it is possible to perform verification on whether a specific configuration of a device conforms to its design when the device is connected by simultaneously setting a physical ID for an ID conversion as well as the specific configuration of the device and registering the set physical ID and specific configuration in the system.

2. Embodiment 2-1. Configuration

FIG. 1 is a diagram for explaining an environment in which an IoT system 11 according to an embodiment is used.

As shown in the same figure, application programs (hereinafter, referred to as "applications" (AP-1 to AP3 are connected to the IoT system 11 via a shared I/F 12 and via a network. Also, devices D1 to D3 are also respectively connected to the IoT system 11 via a network 13 and an I/F 14 of the devices D1 to D3.

The I/F 14 of each of the devices D1 to D3 has a gateway function, and a system ID to be described later is added to data output from each of the devices D1 to D3 to output system ID-added data to the IoT system 11.

FIG. 2 is a diagram illustrating a functional block of the IoT system according to the embodiment. In the same figure, the embodiment will be explained in which the same components as those explained in FIG. 1 are provided with the same reference symbols. In addition, in the embodiment, when devices D-1, D-2, . . . D-n need not be distinctly explained, the devices are explained as "device D" with the hyphen thereof omitted. The other components will be explained in the same manner.

In the same figure, the device D is shown as a representative of the devices D1 to D3, and the device D may represent a plurality of devices. The network 13 is present between the device D and a gateway 25 and/or between the gateway 25 and a data processing unit 26.

The gateway 25 is included in the function of the I/F 14 of the device D. The device D and the gateway 25 basically have a one-to-one relation; however, the relation may N:1 (the gateway 25 houses a plurality of devices D).

An interface function unit 20 reads a setting file C1 including an ID of the device D itself created by a device setting person, a physical ID of sensors/actuators in each device D, and specific device configuration information on the device D. Here, the specific device configuration information includes component information (physical ID) of the device D and relation information for tracing information on each component.

A control unit 21 includes a device configuration verification function unit 22 and an ID space conversion function unit 23, in addition to performing overall control of the IoT system 11.

The device configuration verification function unit 22 determines whether specific device configuration information of each device D is correct by checking it against the device design definition information.

The device configuration verification function unit 22 reads a file C2 including device design definition information. The device design definition information is generalized device configuration information which is used for verifying whether the specific device configuration information on the device D set in the IoT system 11 is correct and created in designing of the device D.

Figure 7:
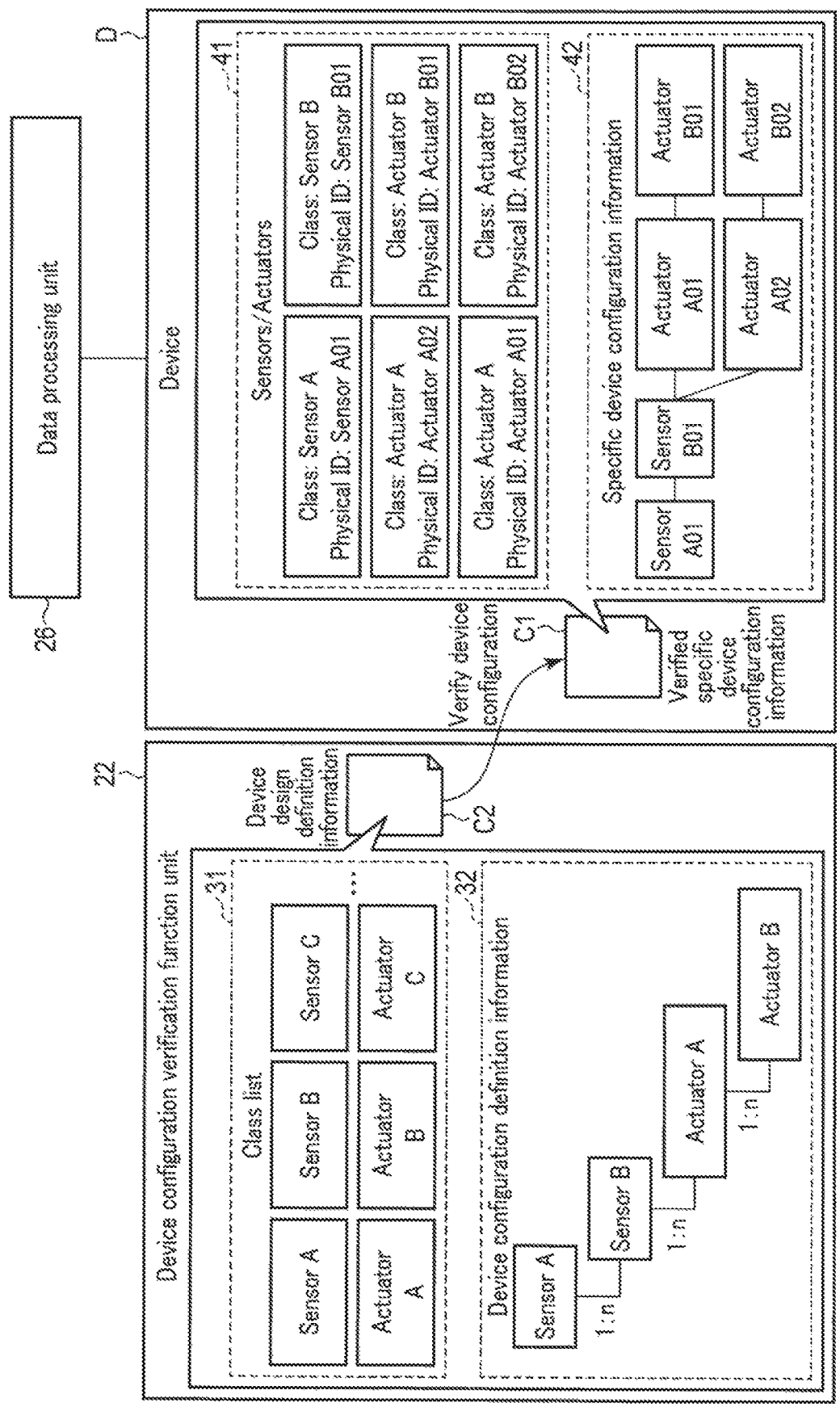
FIG. 7 is a diagram for explaining operations of a device configuration verification function unit 22.

The device design definition information is created when a certain sort of device D is connected to the IoT system 11, based on design information of the device D by the developer, and a single piece of device design definition information exists for a single type of devices in the overall IoT system 11. The device design definition information includes class list information 31 and device configuration definition information 32, as shown in FIG. 7. The device configuration definition information 32 includes generalized component information and relation information for tracing information on each component.

The device configuration verification function unit 22 determines whether an ID of the device D itself, a physical ID of sensors/actuators in each device D, and the specific device configuration information on the device D, included in the setting file C1, having been read into the interface function unit 20 is information corresponding to a correct device conforming to the device design definition information which is included in the read file C2. If the ID or IDs and/or the information do not conform to the device design definition information, the device configuration verification function unit 22 is capable of determining that the specific device configuration information set from the interface function unit 20 is incorrect, and the device configuration verification function unit 22 thus requests the operator to correct the information.

The ID space conversion function unit 23 generates a non-overlapping unique system ID for each type of component, on the basis of a physical ID of a component included in a device which is determined to be a correct device by the device configuration verification function unit 22. Specifically, the ID space conversion function unit 23 uses the ID of the device D itself for defining the scope of the uniqueness of a physical ID given to respective sensors/actuators of the device D. As an ID of the device D itself, a model number of the device or a character string, which is discretionally set by the setting person who connected the device, can be used.

Even when different setting persons simultaneously connect a plurality of devices D in parallel to the IoT system, the setting persons need only show sufficient consideration not to cause overlapping for only the IDs of the devices D themselves, and it is possible to convert ID into non-overlapping system IDs by utilizing the differences in ID of each of the devices, even when the same physical ID is set for sensors/actuators inside the different devices D. That is, all sensors/actuators in a certain class can be uniquely identified by a combination between an ID of the device D itself and each physical ID or a system ID.

A sharing function unit 24 provides notice, to a data processing unit 26 and a gateway 25 which receive data of the sensors/actuators, about a correspondence relationship between a physical ID and a system ID of the device D verified to be correct by the device configuration verification function unit 22, and the verified specific device configuration information. Specifically, the sharing function unit 24 creates a gateway-setting file f2 including a correspondence relationship between a physical ID and a system ID, and verified specific device configuration information, and provides notice of the gateway-setting file f2 to the gateway 25 to share it with the gateway 25. Also, the sharing function unit 24 creates a data processing unit setting file f1, including a correspondence relationship between a physical ID and a system ID, and verified specific device configuration information, and provides notice of it to the data processing unit 26.

The gateway 25 reads a gateway-setting file f2, adds a generated system ID corresponding to the physical ID of sensors/actuators included in the device D to data of the sensors/actuators obtained from the device D on the basis of the read gateway-setting file f2 and outputs system ID-added data to the network 13.

The data processing unit 26 reads the data processing unit setting file f1, determines, based on the data processing unit setting file f1, whether the system ID is included in the data of the sensors/actuators sent from the device D, which is verified to have a correct configuration by the device configuration verification function unit 22, and receives only data output from a component in the device D verified to have a correct configuration. Data provided with system IDs other than this system ID-added data is discarded as incorrect data.

The database DB stores the setting file C1, including an ID of the device D itself, a physical ID of sensors/actuators in each device D, and specific device configuration information of the device D; file C2 including device design definition information; and an ID information table T indicating the associations among a device ID of the device D verified to be a correct device, a physical ID of a component of the device D, and a system ID of the device D.

FIG. 2 illustrates an example of exchange of respective types of information in file format (setting file C1, file C2, data processing unit setting file f1, and gateway-setting file f2); however, the file format is not limited thereto, and it suffices that information can be exchanged. With respect to the information of the gateway-setting file f2, the following configurations can be considered, for example.

1. An API interface is prepared for the sharing function unit 24 to enable the gateway 25 to acquire information on gateway-setting from the sharing function unit 24.

2. An API interface is prepared for the sharing function unit 24 to enable the sharing function unit 24 to give information on the gateway-setting to the gateway 25.

3. A module for sharing information, such as a database, instead of a file, is prepared as an intermediate module between the sharing function unit 24 and the gateway 25, and the sharing function unit 24 and the gateway 25 read information from and write information in the intermediate module.

The setting file C1, file C2, and data processing unit setting file f1 are also the same as the gateway-setting file f2, in that it suffices that information can be exchanged, regardless of the file format.

2-2. Operation 2-2-1. Activation Processing of IoT System

Figure 3:
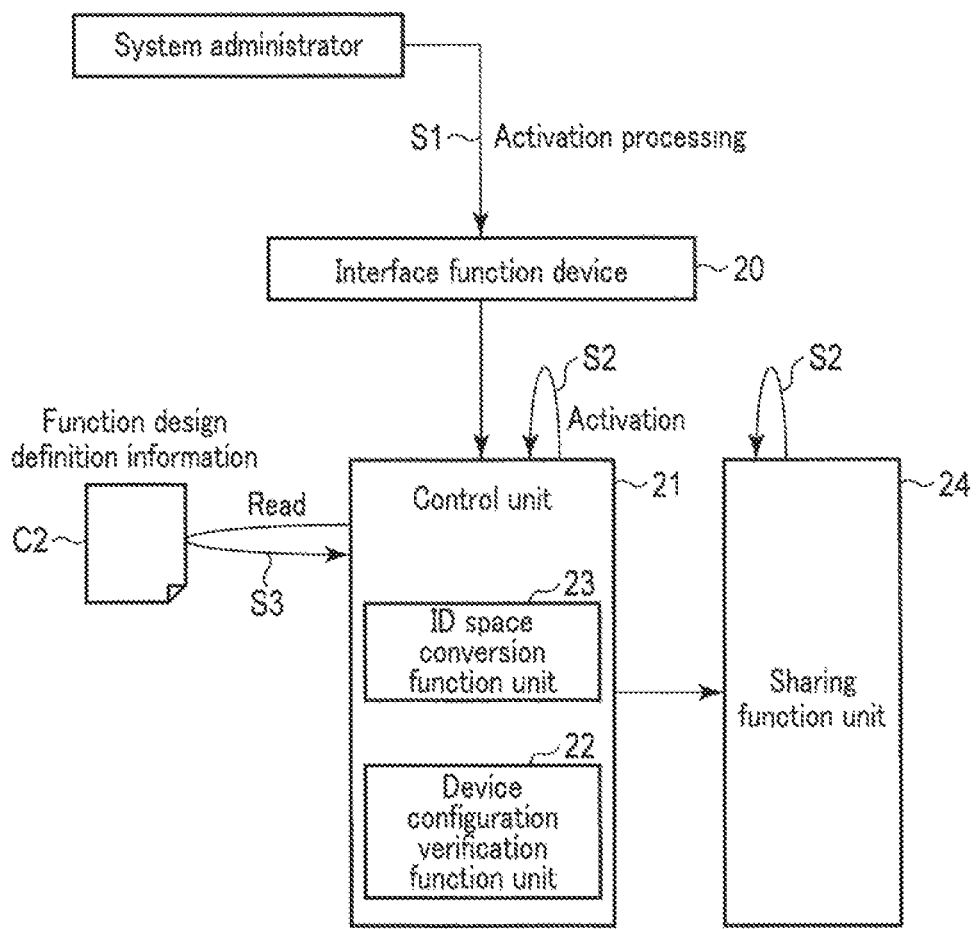
FIG. 3 is a diagram for explaining activation processing of the IoT system 11.

FIG. 3 is a diagram for explaining activation processing of the IoT system 11.

As shown in the same figure, when a system administrator instructs an interface function unit 20 of the IoT system 11 about the activation processing (S1), the interface function unit 20 instructs the device configuration verification function unit 22 and ID space conversion function unit 23 and sharing function unit 24 of the control unit 21 to perform the activation processing (S2).

The device configuration verification function unit 22, ID space conversion function unit 23, and sharing function unit 24 start the activation processing upon receipt of the instructions for activation from the interface function unit 20. At this time, the device configuration verification function unit 22 of the control unit 21 reads a file C2, including device setting definition information, and stores the file C2 in the database DB.

2-2-2. ID Space Conversion Function Unit 23

Next, ID space conversion processing in the ID space conversion function unit 23 will be described with reference to FIG. 4.

A case where a plurality of devices D possessed by a certain company are connected to an IoT system 11 is considered. In the same figure, a device D1 and a device D2 are provided with the same model number, and a physical ID has been given to the sensors/actuators inside the devices.

As the physical ID, the same value has been set to all devices D provided with the same model number, and the physical ID overlaps among these devices; however, a system ID which is generated for each type of sensor/actuator in the IoT system 11 does not permit overlapping among devices. Subsequently, when generating a system ID, the ID space conversion function unit 23 receives the physical ID in a file format from a device setting person, generates a system ID, and outputs the system ID as a setting file for the IoT system 11.

As shown in FIG. 4, components (sensors and actuators) in the device D are provided with a physical ID, and the physical ID is unique in the device D. However, a physical ID used within the device D can overlap among different devices D. For example, a physical ID "B02" of an actuator in the device D1 overlaps a physical ID "B02" of an actuator within the device D2.

The ID space conversion function unit 23 generates a non-overlapping unique system ID for each type of components on the basis of the physical ID of components included in the devices D1 and D2. For example, in FIG. 4, the ID space conversion function unit 23 converts a physical ID "sensor A01" of the device D1 into a system ID "SA00001", and converts a physical ID "sensor B01" of the device D1 into a system ID "SB00001".

Furthermore, the ID space conversion function unit 23 converts a physical ID "sensor A01" of the device D2 into a system ID "SA00002", and converts a physical ID "sensor B01" of the device D2 into a system ID "SB00002". Namely, a system ID is given to components for each of the components (sensor A, sensor B, actuator A, and actuator B) and is unique across the components.

Figure 6:
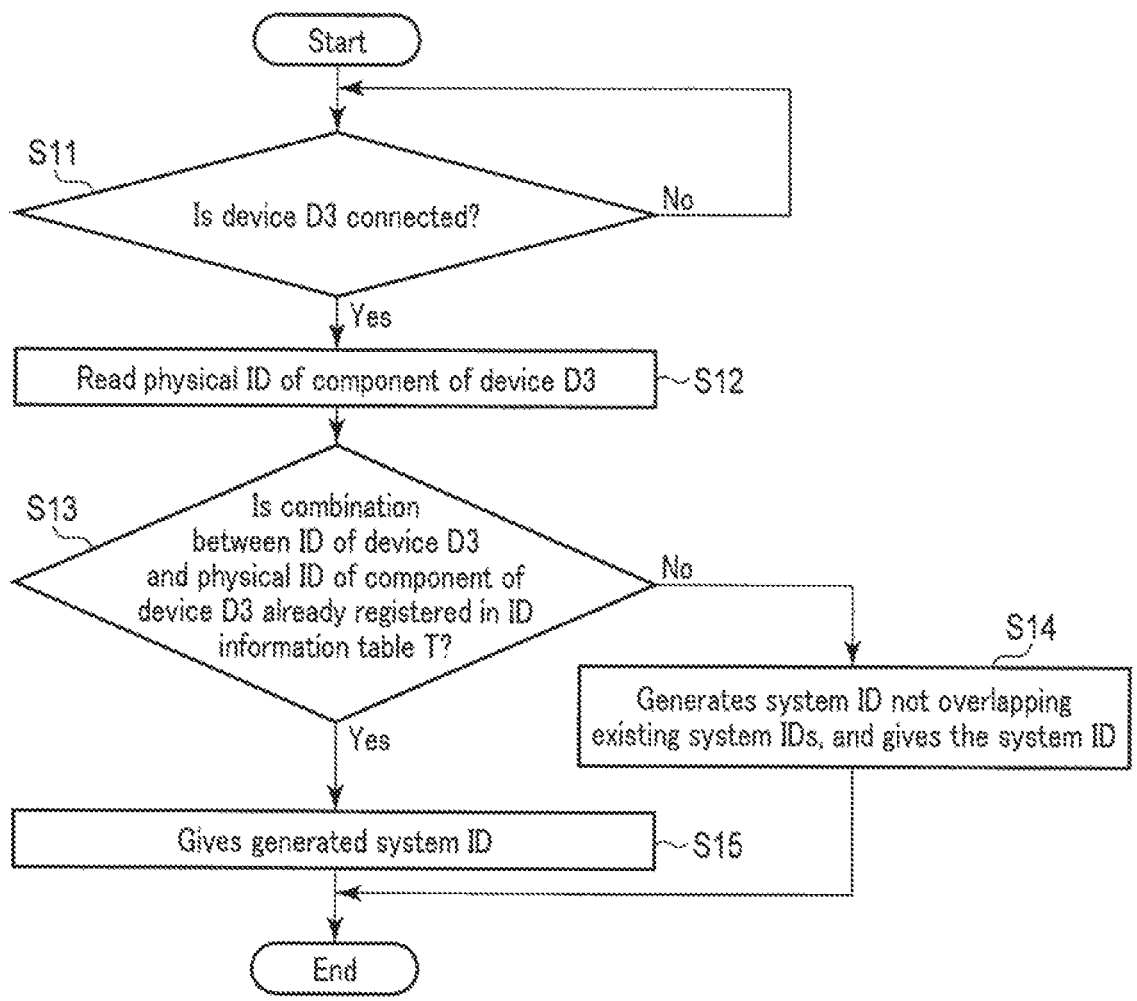
FIG. 6 is a flowchart for explaining an operation of the ID space conversion function unit 23 in the case where the device D3 is connected to the IoT system 11 from the state shown in FIG. 4.

FIG. 5 is a diagram illustrating a case where a device D3 is connected to the IoT system 11 from the state shown in FIG. 4, and FIG. 6 is a flowchart for explaining an operation of the ID space conversion function unit 23 in the case where the device D3 is connected to the Iot system 11 from the state shown in FIG. 4.

As shown in the same figure, it is determined whether or not the device D3 is connected to the IoT system 11 (S11), If it is determined that the device D3 is connected to the IoT system 11, an ID of the device D3 and a physical ID of a component of the device D3 (sensor A01, actuator A02, sensor B01, actuator B01, actuator A01, and actuator B02) are read (S12).

Next, the ID space conversion function unit 23 determines, for each class of components (sensors/actuators), whether or not a combination of the ID of the device D3 and the physical ID of the component of the device D3 has been registered in an ID information table T of the database DB (S13).

In S13, if it is determined that the combination has not been registered in the ID information table T, the device configuration verification function unit 23 generates a system ID which is not overlapping existing system IDs, provides it to data (S14), and ends the processing. This newly generated system ID is registered in the ID information table T of the database DB in association with the device ID of the device D3 and the physical ID of the components of the device D3.

On the other hand, in S13, if it is determined that the combination is already registered in the ID information table T, the device configuration verification function unit 23 provides, to data, a system ID corresponding to the device ID of the device D3 and the physical ID of the component of the device 3 that have been registered in the ID information table T of the database DB (S15), and then ends the processing.

2-2-3. Device Configuration Verification Function Unit 22

Next, the operation of the device configuration verification function unit 22 is explained with reference to FIG. 7.

The case where a certain existing device D is connected to the IoT system is considered. This device D has no exclusive function for being connected to the IoT system 11, and a device setting person needs to manually set specific device configuration information 42 of the device D.

Information set by a device setting person includes component information 41 in which each class of components, such as sensors/actuators and a physical ID of the components are stored in association with each other, and specific device configuration information 42 including relation information for tracing each component.

Meanwhile, the file C2 for this device D is read by the device configuration verification function unit 22. The file C2 includes class list information 31 and device configuration definition information 32 which is included in the device design definition information. The class list information 31 is information indicating the class of components, such as sensor A, actuator A, and sensor B. The device configuration definition information 32 consists of names of components in each class and relation information for tracing these components in each class. The designer of the device creates, for an IoT system 12, device design definition information, which is a general-purpose device configuration. For example, in FIG. 7, the sensor A can be connected to the sensor B in a 1:n (one-to-n) relation, and the sensor B can be connected to the actuator A in a one-to-n relation.

The device configuration verification function unit 22 maintains the device design definition information as correct information of specific device configuration information on the device D1, receives the specific device configuration information in the form of a file or a communication when the device is connected, and verifies whether the received specific device configuration information conforms to the device design definition information stored in the file C2. If the specific device configuration information of the device D is correct, the device configuration verification function unit 22 outputs the verified configuration as a setting file C1 for the IoT system 11; however, if the specific device configuration information is incorrect, the device configuration verification function unit 22 provides notice to the user accordingly and induces the user to correct the information.

Figure 8:
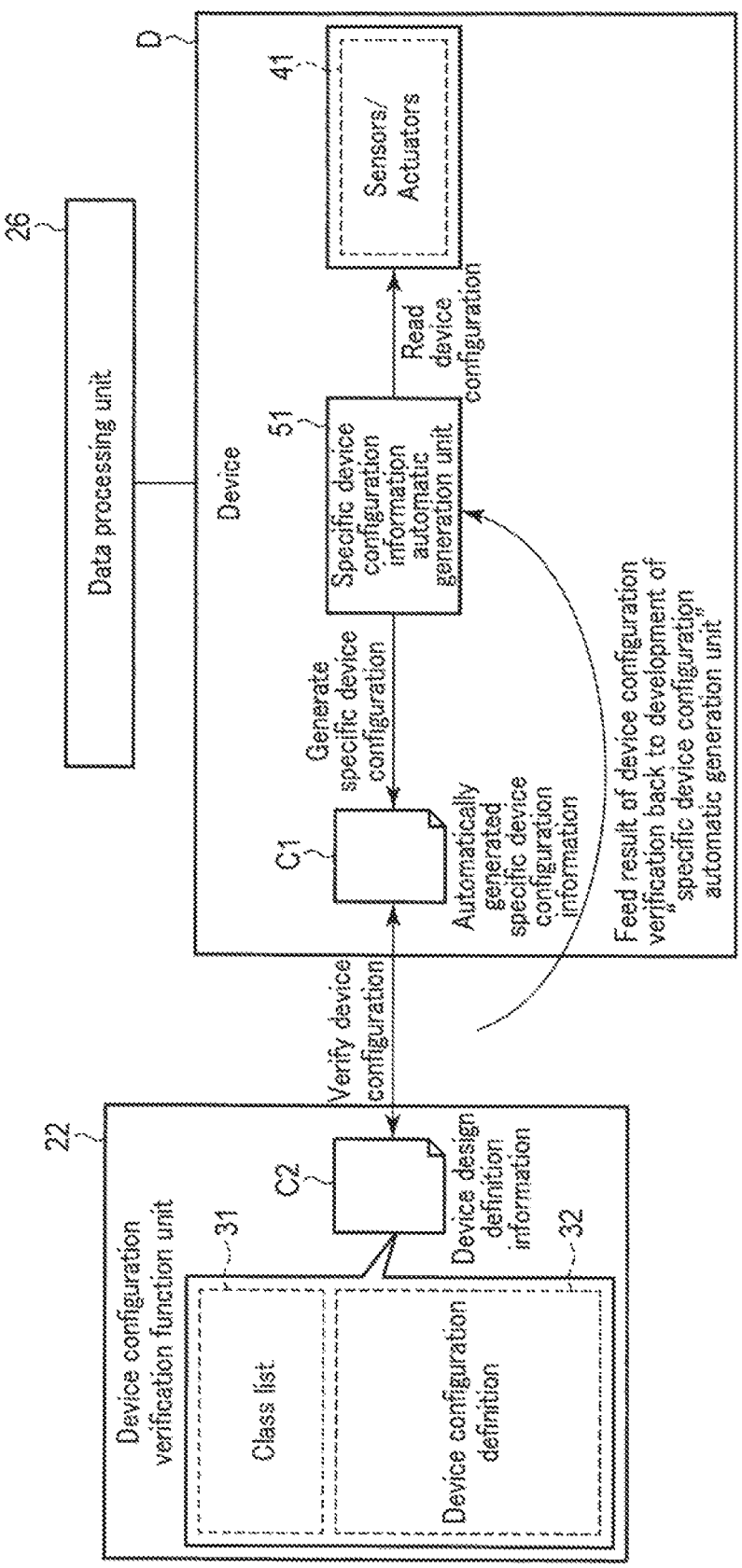
FIG. 8 is a diagram for explaining the development of a device configuration automatic generation function of a device D corresponding to the IoT system in development of the device D.

Next, a device configuration verification of the device D at the time of its development is described. FIG. 8 is a diagram illustrating a device configuration verification system that checks specific device configuration information of a device D corresponding to the IoT system against device design definition information and determines whether the specific device configuration information is correct.

The case where a device D corresponding to the IoT system 11 is newly developed is considered. This device D includes an exclusive function for being connected to the IoT system 11, and thus when the device D is individually connected to the IoT system 11, the device D automatically generates correct specific device configuration information conforming to the device design definition information, and inputs the information in the device configuration verification function unit 22. In this case, the device configuration verification when the device D is connected always results in a success.

Meanwhile, in the development of the device D, it is necessary to develop a "function to automatically generate a correct specific device configuration". In order to confirm whether the function under development at this stage operates accurately, the device configuration verification function unit 22 can be utilized.

In the same figure, a specific device configuration information automatic generation unit 51 reads component information 41 in which a class of components, such as sensors/actuators and a physical ID of the components, are stored in association with each other, and automatically generates specific device configuration information on the basis of the read component information 41.

The device configuration verification function unit 22 verifies whether the specific device configuration information that has been automatically generated by the specific device configuration information automatic generation unit 51 conforms to the device design definition information stored in the file C2.

When the automatically generated specific device configuration information does not conform to the device design definition information stored in the file C2, the device configuration verification function unit 22 feeds the verification result back to the specific device configuration information automatic generation unit 51. The result fed back is utilized in the development of the specific device configuration information automatic generation unit 51 in the device D.

In the meanwhile, under the condition that specific device configuration information on all patterns automatically output by the specific device configuration information automatic generation unit 51 is determined to be correct by the device configuration verification function unit 22, the specific device configuration information automatic generation unit 51 determines that the specific device configuration information on the device D is completed.

2-2-4. Processing When Connecting Device D

Figure 9:
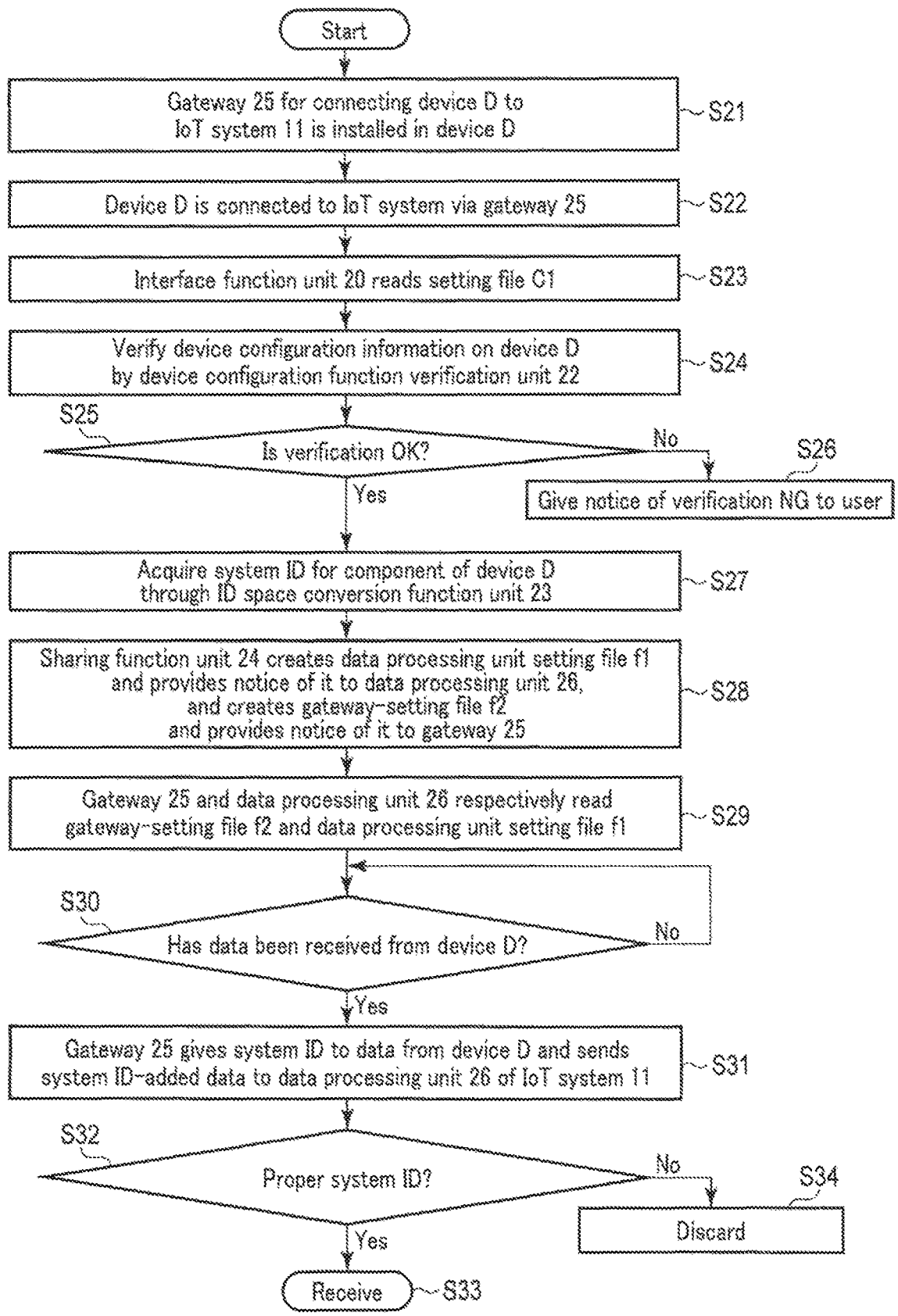
FIG. 9 is a flowchart for explaining an operation when the device D is connected to the IoT system 11.
Figure 10:
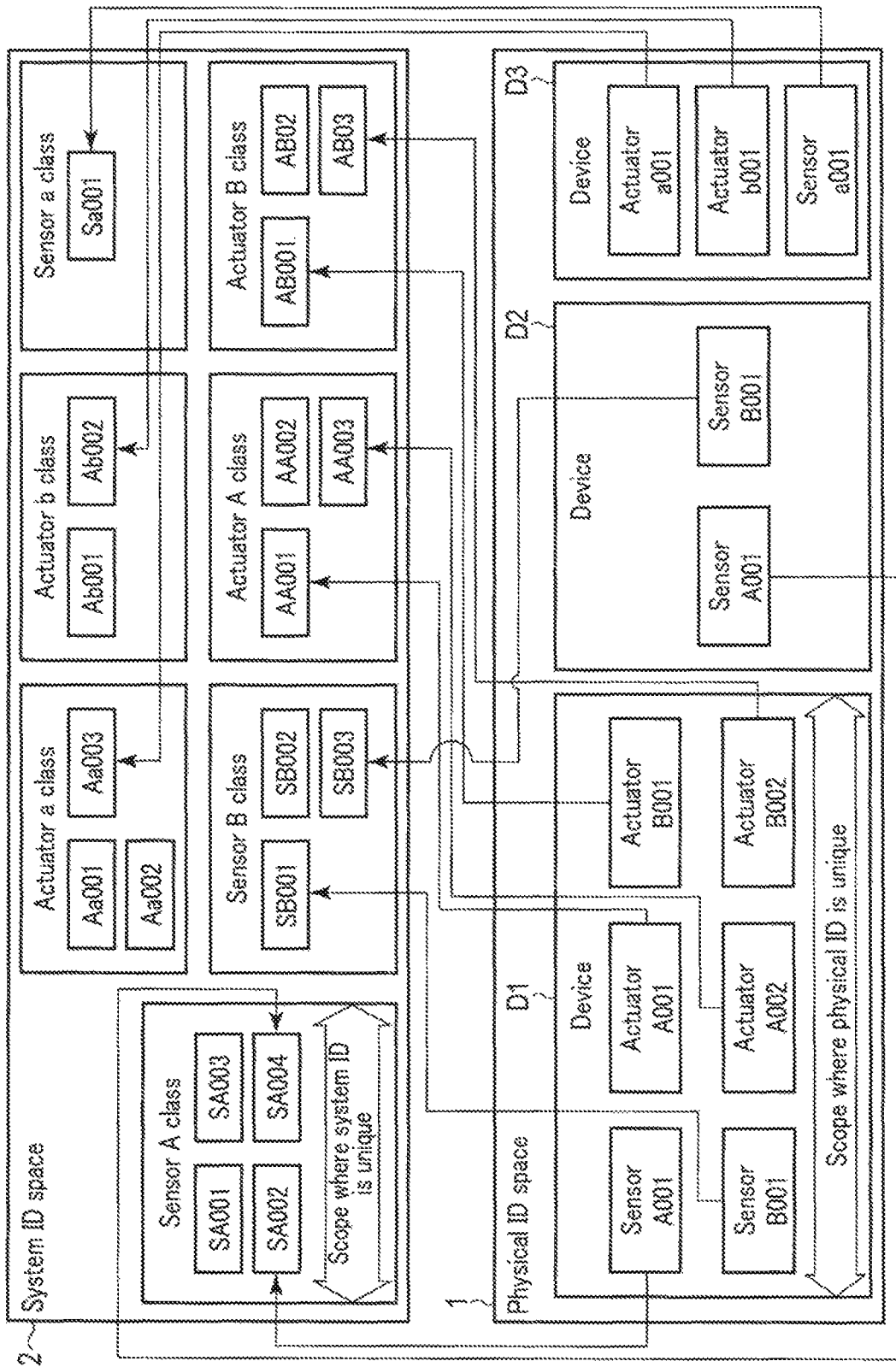
FIG. 10 is a diagram illustrating a correspondence relationship between a physical ID and a system ID.

FIG. 9 is a flowchart for explaining the operation of the device D when connected to the IoT system 11.

First, a gateway 25 for connecting the IoT system 11 to the device D is installed by a device setting person (S21). Next, the device D is connected to the IoT system 11 via the installed gateway 25 (S22).

Next, a setting file C1 of the device D is created by the device setting person, and the created setting file C1 is read by an interface function unit 20 (S23). Subsequently, device configuration information of the device D is verified by the device configuration verification function unit 22 (S24). In S25, if the verification is NG, a notice to the effect that the verification is NG is given to the user to induce the user to correct the device configuration information (S26). In contrast, in S25, if the verification is OK, the ID space conversion function unit 23 acquires a system ID for the component of the device D (S27).

Subsequently, a sharing function unit 24 creates a data processing unit setting file f1 and provides notice of it to the data processing unit 26, as well as creating a gateway-setting file f2, and provides notice of it to the gateway 25 (S28). The gateway 25 and the data processing unit 26 respectively read the gateway-setting file f2 and the data processing unit setting file f1 (S29).

Subsequently, whether or not data has been received from the device D is determined (S30). In S30, when it is determined that data has been received from the device D, the gateway 25 provides a system ID to the data from the device D on the basis of the gateway-setting file f2 and sends the system ID-added data to the data processing unit 26 of the IoT system 11 via a network 11 (S31).

The data processing unit 26 determines, on the basis of the data processing unit setting file f1, whether a system ID is included in the data of sensors/actuators sent from the device D, whose configuration has been determined to be correct by the device configuration verification function unit 22 (S32).

In S32, when it is determined that a valid system ID is not included in the data, the data is discarded (S34). In contrast, when it is determined that a valid system ID is included in the data, the data processing unit 26 receives the data (S33). The received data is stored in database DB and can be referred to from an application AP.

2-3. Effect

In the IoT field, a number of different devices D as well as a number of applications AP use a shared data processing system. In a device, connection, disconnection, re-connection, and a change to its configuration arise; however, even under these situations, it is expected that an application can always use the same ID to access the same data resource.

According to the invention of the present application, it is possible to provide a system ID which allows an application AP to access to data of the same sensors/actuators, regardless of the state of the device D, by providing a function for unitarily converting a physical ID, which is unique to sensors and actuators within a single device D, to a unique system ID within the IoT system 11.

When an attempt is made to connect, to the IoT system 11, a device D which has already been set, and it is difficult to add a new function for connection to the IoT system 11, the act of manually setting a device configuration, etc., is considered; however, it is possible to easily connect, to the IoT system 11, the device D having no IoT connection function and greatly broaden the types usable in the IoT system 11, as well as the volume of data usable in the IoT system 11, by providing a function for checking the manually set specific function configuration against the device design definition information and verifying whether the specific device configuration is correct.

Use of the present invention allows various applications AP to acquire data output from a variety of devices D by using a consistent ID, and enables construction of an IoT system 11 promoting distribution and utilization of IoT data.

With respect to a plurality of devices D of the same type existing in a factory, as an example of applications AP, an application AP is assumed which collects information on actuators in a specific class, and foresees failure of an actuator. It is assumed that this application AP is capable of foreseeing an actuator which is highly likely to cause failure in the near future by acquiring data of actuators in class A of all devices D from the data processing unit 26 and statistically performing outlier processing. In the absence of the ID conversion function provided by the present invention, the application needs to access a device D using an ID of the device D, then ascertain specific configurations of the respective devices D, and find actuators in the class A, and acquire data thereon. That is, in order to obtain data of the actuators in the class A among all the devices D, the application needs to ascertain specific configurations of all the devices.

In contrast, when the present invention is used, data has been converted into a system ID crossing the devices D, and thus the application AP can acquire data of all of the actuators in the class A without being aware of the structures of the respective devices D, by an operation referred to as "Acquire a list of actuators in class A", and it is possible to reduce the development costs of applications. In addition, it is generally known that the degree of accuracy of statistical processing rises with when the parameters of data as a source are increased.

The operation cost for accurately connecting the device D to the system can be reduced by using the device configuration verification function in the present invention. It therefore also becomes easy to connect a number of sensors/actuators in a specific class to the system. This function makes it easy to accumulate, in a data processing unit, a large amount of correct data which is a parameter of statistical processing and enables improvements in accuracy of statistical processing.

Furthermore, according to the invention of the present application, it is possible to promote utilization of IoT data by providing a technique of offering a consistent and usable ID and a setting support technique. The technique of offering a consistent and usable ID is offered to an application AP, during the life cycle of a device D, through a mechanism of maintaining a one-to-one relation of each ID while separating respective ID spaces from each other for a physical ID and system IDs assigned to sensors/actuators within a physical device D, from the perspective of characteristics of IoT for which a variety of different applications AP and devices D are connected to a shared data processing system, and connection/disconnection of each of the devices D is performed. The setting support technique is for connecting existing devices D to an IoT system 11 without performing an addition of a function.

The invention of the present application is not limited to the embodiments described above and can be modified diversely without departing from the scope of the gist at the stage where the invention is implemented. The respective embodiments described above may be implemented in the form of an appropriate combination as much as possible. In this case, combined effects can be obtained. Furthermore, the embodiments described above include inventions in various phases, and a variety of inventions can be extracted by an appropriate combination in a plurality of the disclosed configuration requirements. For example, in the case where the problem described in "Summary" can be solved and the effect described therein can be obtained, even when some configuration requirements are deleted from all of the configuration requirements disclosed in the embodiments, the configuration in which the configuration requirements have been deleted can be extracted as an invention.

The invention claimed is:

1. An ID space conversion system which consistently provides setting information to both a gateway and a data processing unit, to which a plurality of devices each including components are connected via the gateway and a network and a plurality of applications are connected, the data processing unit being configured to mediate data between the plurality of devices and the plurality of applications, the system comprising:
 a processor; and
 a storage medium having computer program instructions stored thereon, when executed by the processor, perform to:
 generate a non-overlapping unique system ID for each type of the components on the basis of a physical ID of a component included in the device; and
 create gateway-setting information including a correspondence relationship between the physical ID of the component included in the device and the system ID generated by the ID space conversion function unit, and shares the gateway-setting information with the gateway,
 wherein the data processing unit determines whether data of the component of the device sent from the device via the gateway includes the generated system ID, and
 the gateway adds, based on the created gateway-setting information, to the data of the component obtained from the device, the generated system ID corresponding to the physical ID of the component included in the device to output system ID-added data to the network.

2. The ID space conversion system according to claim 1, wherein the computer program instructions further perform to
 determine whether specific device configuration information, including component information on the device given to the ID space conversion system and relation information for tracing the component information, is information corresponding to a correct device which conforms to device design definition information defined for each of the plurality of devices, and consisting of component definition information indicating each component and relation information for tracing the component definition information, and
 generate the system ID for the device determined to be a correct device by the device configuration verification function unit.

3. The ID space conversion system according to claim 2, wherein the computer program instructions further perform to share, between the sharing function unit and the gateway, the specific device configuration information for the device determined to be a correct device.

4. The ID space conversion system according to claim 1, wherein the computer program instructions further perform to generate a new system ID that does not overlap existing system IDs when a new device is connected to the ID space conversion system, and when a combination of an ID of the new device and a physical ID of the new device has not been registered.

5. The ID space conversion system according to claim 1, wherein the computer program instructions further perform to re-use a generated system ID when a new device is connected to the ID space conversion system, and when a combination of an ID of the new device and a physical ID of the new device is already registered.

6. The ID space conversion system according to claim 1, wherein the computer program instructions further perform to discard the data of the component of the device sent from the device via the gateway when the data of the component of the device does not include the generated system ID.

7. The ID space conversion system according to claim 2, wherein the computer program instructions further perform to report that the device connected to the ID space conversion system, or setting thereof, is not correct when the component information or relation information of the specific device configuration information on the device is determined to be incorrect.

8. An ID space conversion method for an ID space conversion system which consistently gives setting information to both a gateway and a data processing unit, to which a plurality of devices each including components are connected via the gateway and a network and a plurality of applications are connected, the data processing unit being configured to mediate data between the plurality of devices and the plurality of applications, the method comprising:
 generating a non-overlapping unique system ID for each type of component on the basis of a physical ID of a component included in the device;
 creating gateway-setting information including a correspondence relationship between the physical ID of the component included in the device and the system ID generated by the ID space conversion function unit and sharing the gateway-setting information with the gateway;
 determining whether the data of the component of the device sent from the device via the gateway includes the generated system ID;
 adding, based on the created gateway-setting information, to the data of the component obtained from the device, the generated system ID corresponding to the physical ID of the component included in the device on the basis of the created gateway-setting information to output system ID-added data to the network.

9. The ID space conversion method according to claim 8, further comprising:

determining whether the device indicated by specific device configuration information including component information on the device given to the ID space conversion system and relation information for tracing the component information is a correct device which conforms to device design definition information defined for each of the plurality of devices, and consisting of component definition information indicating each component and relation information for tracing the component definition information, wherein the system ID is generated for the device determined to be a correct device.

10. The ID space conversion method according to claim 9, further comprising:

sharing, between the sharing function unit and the gateway, the specific device configuration information about the device determined to be a correct device.

11. The ID space conversion method according to claim 8, wherein generating the system ID comprises generating a new system ID that does not overlap existing system IDs when a new device is connected to the ID space conversion system, and when a combination between an ID of the new device and a physical ID of the new device is not registered.

12. The ID space conversion method according to claim 8, wherein generating the system ID comprises re-using a generated system ID when a new device is connected to the ID space conversion system and when a combination between an ID of the new device and a physical ID of the new device is registered.

13. The ID space conversion method according to claim 8, further comprising:

discarding the data of the component of the device sent from the device via the gateway when the data processing unit determines that the data of the component of the device does not include the generated system ID.

14. The ID space conversion method according to claim 9, further comprising:

reporting that the device connected to the ID space conversion system or setting thereof, is not correct when it is determined that the component information or relation information of the specific device configuration information of the device is not correct as a result of the process of determining whether the device is the correct device.

15. A non transitory computer readable storage medium storing a program for causing the ID space conversion system to implement the ID space conversion method according to claim 8.

16. A non transitory computer readable storage medium storing a program for causing the ID space conversion system to implement the ID space conversion method according to claim 9.

17. A non transitory computer readable storage medium storing a program for causing the ID space conversion system to implement the ID space conversion method according to claim 10.

18. A non transitory computer readable storage medium storing a program for causing the ID space conversion system to implement the ID space conversion method according to claim 11.

19. A non transitory computer readable storage medium storing a program for causing the ID space conversion system to implement the ID space conversion method according to claim 12.

20. A non transitory computer readable storage medium storing a program for causing the ID space conversion system to implement the ID space conversion method according to claim 13.

* * * * *